United States Patent [19]
Dillon

[11] Patent Number: 6,024,294
[45] Date of Patent: Feb. 15, 2000

[54] PORTABLE SPREADER

[76] Inventor: Patrick Dillon, 172 River Dr., Lake Hiawatha, N.J. 07034

[21] Appl. No.: 09/089,970

[22] Filed: Jun. 3, 1998

[51] Int. Cl.⁷ ............................... A23P 1/08; A01C 17/00
[52] U.S. Cl. .................................. 239/7; 239/687
[58] Field of Search ................... 222/324, 239; 239/652, 653, 377, 687, 681, 7

[56] References Cited

U.S. PATENT DOCUMENTS

| | | |
|---|---|---|
| 2,989,314 | 6/1961 | Larson ..................................... 239/683 |
| 3,096,984 | 7/1963 | Garrison . |
| 3,157,402 | 11/1964 | Love, Jr. . |
| 3,993,225 | 11/1976 | Manni ...................................... 222/324 |
| 4,998,674 | 3/1991 | Torra ....................................... 239/652 |
| 5,501,405 | 3/1996 | Doornek .................................. 239/683 |

*Primary Examiner*—Andres Kashnikow
*Assistant Examiner*—Davis Hwu
*Attorney, Agent, or Firm*—Terrance L. Siemens

[57] ABSTRACT

A portable spreader of small particulate materials comprising a container having a wide mouth neck. The container holds the small particulate materials therein. A cap has a top opening. The cap engages with the wide mouth neck of the container. An electronic device is built onto the cap over the top opening, for distributing the small particulate materials away from the container, when the container held in a hand of a person is inverted.

2 Claims, 1 Drawing Sheet

PORTABLE SPREADER

BACKGROUND OF THE INVENTION

1. Field of the Invention

The present invention relates to devices which dispense small particulate materials, such as chemicals, fertilizers, seeds, insecticides, weed killers, herbicides, pellets over areas to be covered.

More particularly, the invention comprises a portable spreader that will enable a person to apply a substance, such as snow/ice melt pellets, calcium chloride or similar chemicals, much more efficiently.

2. Description of the Prior Art

When a person finds it necessary to spread various types of granular materials about an environment, different kinds of dispensing devices are available for this purpose. Dispensing devices are shown in U.S. Pat. No. 3,096,984, issued to Marvin L. Garrison on Jul. 9, 1963, U.S. Pat. No. 3,157,402, issued to William D. Love, Jr., on Nov. 17, 1964, U.S. Pat. No. 3,993,225, issued to Mario Manni on Nov. 23, 1976 and U.S. Pat. No. 4,998,674, issued to Allesandro Torra on Mar. 12, 1991.

In each one of these prior art inventions, the dispensing devices are either manually operated or contain top feeding chambers that have to be filled with the granular materials. This can cause a messy and dangerous situation, if the granular materials are accidentally spilled out of the feeding chambers to fall upon the ground or on the user.

None of the above inventions and patents, taken either singly or in combination, is seen to describe the instant invention as claimed.

SUMMARY OF THE INVENTION

The present invention is a portable spreader of small particulate materials, such as snow/ice melt pellets, calcium chloride or similar chemicals. The portable spreader contains a battery operated motor, impeller and stirring rod built into a cover of a typical standard wide mouth container, so that when inverted and turned on will evenly distribute the small particulate materials.

Accordingly, it is a principal object of the invention to provide a portable spreader that will overcome the shortcomings of the prior art devices.

It is another object of the invention to provide a portable spreader that is a motorized hand held unit which will enable a person to spread small particulate materials much more efficiently about an environment.

An additional object of the invention is to provide a portable spreader that can be used by school and industrial building maintenance personnel to greatly reduce their yearly salting budgets.

A further object of the invention is to provide a portable spreader that is simple and easy to use.

A still further object of the invention is to provide a portable spreader that is economical to manufacture.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
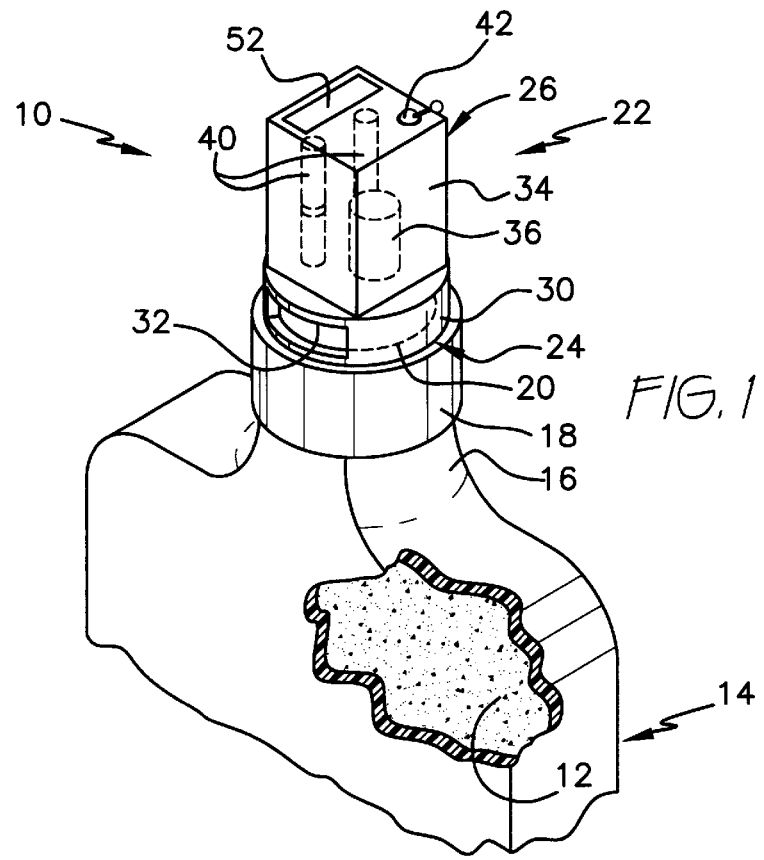
FIG. 1 is a perspective view of an upper portion of a container with the present invention installed thereto.
Figure 2:
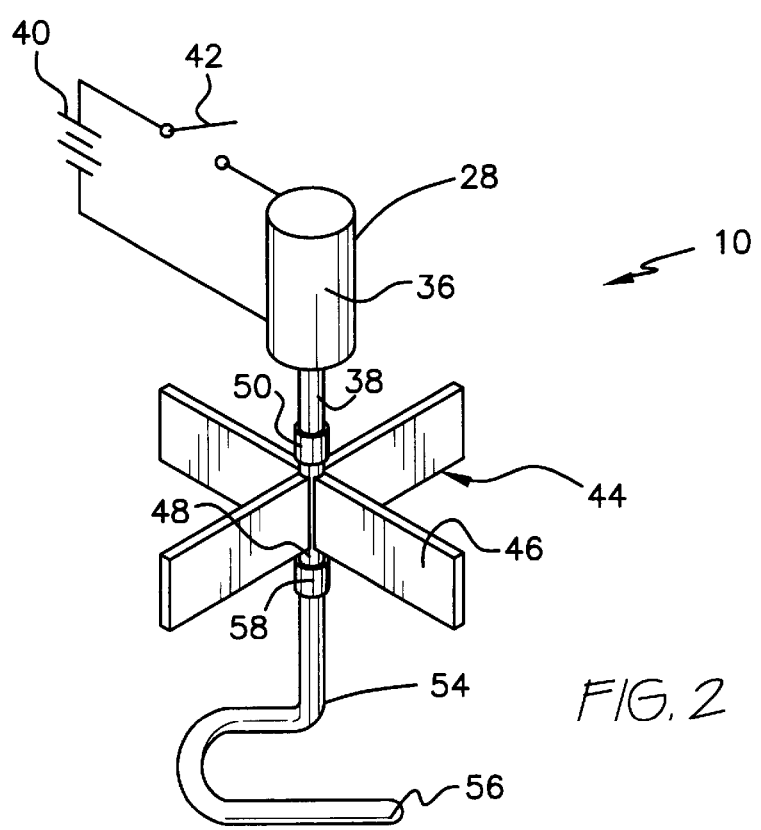
FIG. 2 is a perspective view of the drive assembly of the present invention.

Turning now descriptively to the drawings, in which similar reference characters denote similar elements throughout the several views, FIGS. 1 and 2 illustrate the present invention being a portable spreader 10 of small particulate materials 12, comprising a container 14 having a wide mouth neck 16. Container 14 holds small particulate materials 12 therein. A cap 18 has a top opening 20. Cap 18 engages with wide mouth neck 16 of container 14. An electronic device 22 is built onto cap 18 over top opening 20, for distributing small particulate materials 12 away from container 14, when container 14 held in a hand of a person is inverted.

Automatically electronic device 22 includes a distribution unit 24 mounted over top opening 20 of cap 18. A control casing 26 is affixed to distribution unit 24. An electric drive assembly 28 urges small particulate materials 12 in distribution unit 24 to exit therefrom, when inverted and drive assembly 28 is turned on.

Distribution unit 24 is a cylindrical shaped housing 30, having a side outlet port 32 therein, so that small particulate materials 12 can exit through side outlet port 32. Control casing 26 is a box-shaped enclosure 34, which acts as a protective covering for drive assembly 28 therein.

Drive assembly 28 consists of an electric motor 36 in control casing 26. Electric motor 36 has a drive shaft 38 extending into distribution unit 24. At least one battery 40 is in control casing 26. Battery 40 is electrically connected to electric motor 36. An on-off switch 42 is on control casing 26 and is electrically connected between the electric motor 36 and battery 40. An impeller 44 is in distribution unit 24. Impeller 44 has a plurality of radially extending vanes 46 and a driven shaft 48 coupled at 50 to drive shaft 38 of the electric motor 36.

Control casing 26 includes a battery hatch cover 52. When battery hatch cover 52 is opened, a person can gain access to battery 40 for replacement when needed. Drive assembly 28 further contains a stirring rod 54, having a hook end 56. Stirring rod 54 is coupled at 58 to drive shaft 48 of impeller 44. Hook end 56 extends into wide mouth neck 16 of container 14. Stirring rod 54, with hook end 56, will rotate to prevent small particulate materials 12 within container 14 from sticking together.

To use portable spreader 10, a person simply replaces a standard cap on the container 14 with cap 18 of the present invention. Container 14 is grasped and inverted, so that particulate materials 12 will fall into distribution unit 24. On-off switch 42 is then turned on, to cause impeller 44 to rotate and eject particulate materials 12 through the side outlet port 32. Stirring rod 54 will rotate simultaneously, to mix small particulate materials 12 in wide mouth neck 16 of container 14.

It is to be understood that the present invention is not limited to the embodiments described above, but encompasses any and all embodiments within the scope of the following claims.

I claim:

1. A method for spreading small particulate material with a portable spreader comprising the steps of:

providing a container having a wide mouth neck that defines a single opening to hold small particulate material;

filling said container with small particulate material;

providing a cap, said cap including a top opening, to engage with said wide mouth neck of said container;

providing an electronic device including a electric drive assembly having an electric motor, said electric motor further being provided with a selective power on/off switch, said electric motor being located within a control casing, where said control casing is located over said top opening of said cap;

engaging said cap with said wide mouth neck of said container;

providing a distribution unit comprising a cylindrically shaped housing including a side outlet port aperture, where said distribution unit is located between said electric drive assembly and said top opening of said cap, and where said distribution unit is in communication with said wide mouth neck;

providing an impeller having a plurality of radially extending vanes, said impeller being located within said distribution unit, said impeller further including a drive shaft connected to said electric motor;

providing a stirring rod having a hook end, said stirring rod being attached to said drive shaft below said impeller, opposite said electric drive assembly, and with said hook end of said stirring rod extending into said wide mouth neck of said container to prevent aggregation of the particulate material;

selectively energizing said electric motor to drive said impeller by means of said drive shaft; and inverting said portable spreader to allow the particulate matter to flow into said distribution unit and thus be expelled through said side outlet port aperture by means of said impeller.

2. A method for spreading small particulate material with a portable spreader comprising the steps of:

providing a container having a wide mouth neck that defines a single opening to hold small particulate material;

filling said container with small particulate material;

providing a cap, said cap including a top opening, to engage with said wide mouth neck of said container;

providing an electronic device including a electric drive assembly having an electric motor, said electric motor further being provided with a selective power on/off switch, said electric motor being located within a control casing, where said control casing is located over said top opening of said cap;

engaging said cap with said wide mouth neck of said container;

providing a distribution unit comprising a cylindrically shaped housing including a side outlet port aperture, where said distribution unit is located between said electric drive assembly and said top opening of said cap, and where said distribution unit is in communication with said wide mouth neck;

providing an impeller having a plurality of radially extending vanes, said impeller being located within said distribution unit, said impeller further including a drive shaft connected to said electric motor;

providing a stirring rod having a hook end, said stirring rod being attached to said drive shaft below said impeller, opposite said electric drive assembly, and with said hook end of said stirring rod extending into said wide mouth neck of said container to prevent aggregation of the particulate material;

inverting said portable spreader; and selectively energizing said electric motor to drive said impeller by means of said drive shaft to allow the particulate matter to flow into said distribution unit and thus be expelled through said side outlet port aperture by means of said impeller.

* * * * *